115,941

UNITED STATES PATENT OFFICE.

JOHN DETRICK AND WILLIAM B. NIVEN, OF BELLEFONTAINE, OHIO, ASSIGNORS TO WILLIAM B. NIVEN, OF SAME PLACE.

IMPROVEMENT IN BEE-HIVES.

Specification forming part of Letters Patent No. 115,941, dated June 13, 1871.

We, JOHN DETRICK and WILLIAM B. NIVEN, of Bellefontaine, in the county of Logan and State of Ohio, have invented a new and Improved Bee-Hive, of which the following is a specification:

Nature and Objects of the Invention.

The object of the invention is to secure a more perfect ventilation than has been hitherto effected in bee-hives for the purposes of removing the foul air and carrying off the moisture which would otherwise accumulate in the hive. This we effect in a superior manner by admitting the fresh air at the bottom of the hive and causing the vitiated air and moisture to be expelled at or below the lower part of the honey-box, thus permitting the brood-chamber to receive the full benefit of the circulation created by the upmoving current of air warmed by the animal heat of the bees or otherwise, while the air being expelled at the sides and below the honey-box occasions a stronger draft in consequence of not having to force out a large body of superincumbent air, which is comparatively cool, as commonly happens when the vent is at the top of the hive.

Description of the Accompanying Drawing.

Figure 1 is a perspective view of the hive, one of the sides being removed. Fig. 2 is a transverse vertical section.

In the different figures similar letters indicate corresponding parts.

General Description.

A is the body of the hive, which is square in horizontal section, the height being preferably about double the width of the box. It has a hinged door, B, at its upper and rear part, in height equal to about one-third the depth of the hive, which affords entrance to the honey-chamber. Below this door, and near the top of the brood-chamber, is a sliding door, C, of about the same height as the hinged upper door, beneath which is inserted a strip of glass, enabling a view to be obtained of the brood-chamber within. The bottom of the box A has a projecting base, D, permanently attached thereto, the interior of which fits accurately over and around strips d, fixed to the bottom or lighting-stand E, which serve to keep the box in place and allow it to be readily removed. a a are apertures for the entrance and exit of the bees. The lighting-stand E has tapering strips E' affixed to its under side, so as to incline the hive forwardly, and an aperture, H, protected by a diaphragm or perforated plate, for the entrance of air. The cover I is kept in place by ledges on its under side, which surround the top of the box. The brood-chamber C' is provided with vertical frames $a'\ a'\ a'$, which slide between guide-blocks or similar devices, and rest on a cross-piece at bottom. These frames are preferably perforated to allow a more ready passage to the bees. K K are the air-eduction tubes. One or more may be used. They are connected with openings $k$ in the sides of the hive, at top of the brood-chamber and below the honey-chamber, and are bent or elbow-shaped, having apertures near the top, permitting escape of air, but preventing access of insects, and are protected by caps $k'$ to keep out light and moisture. The honey-box (or boxes) L entirely fills the part of the hive above the brood-chamber, and has a glass window. It differs from any with which we are acquainted in having no bottom, that part being entirely open, which we claim as an improvement on the usual method of construction, allowing more ready access of the bees. It is readily removed from the box by lifting or sliding out.

CHARLES H. DOUGLAS.
Improvement in Lifting Apparatus.
No. 115,942.  Patented June 13, 1871.
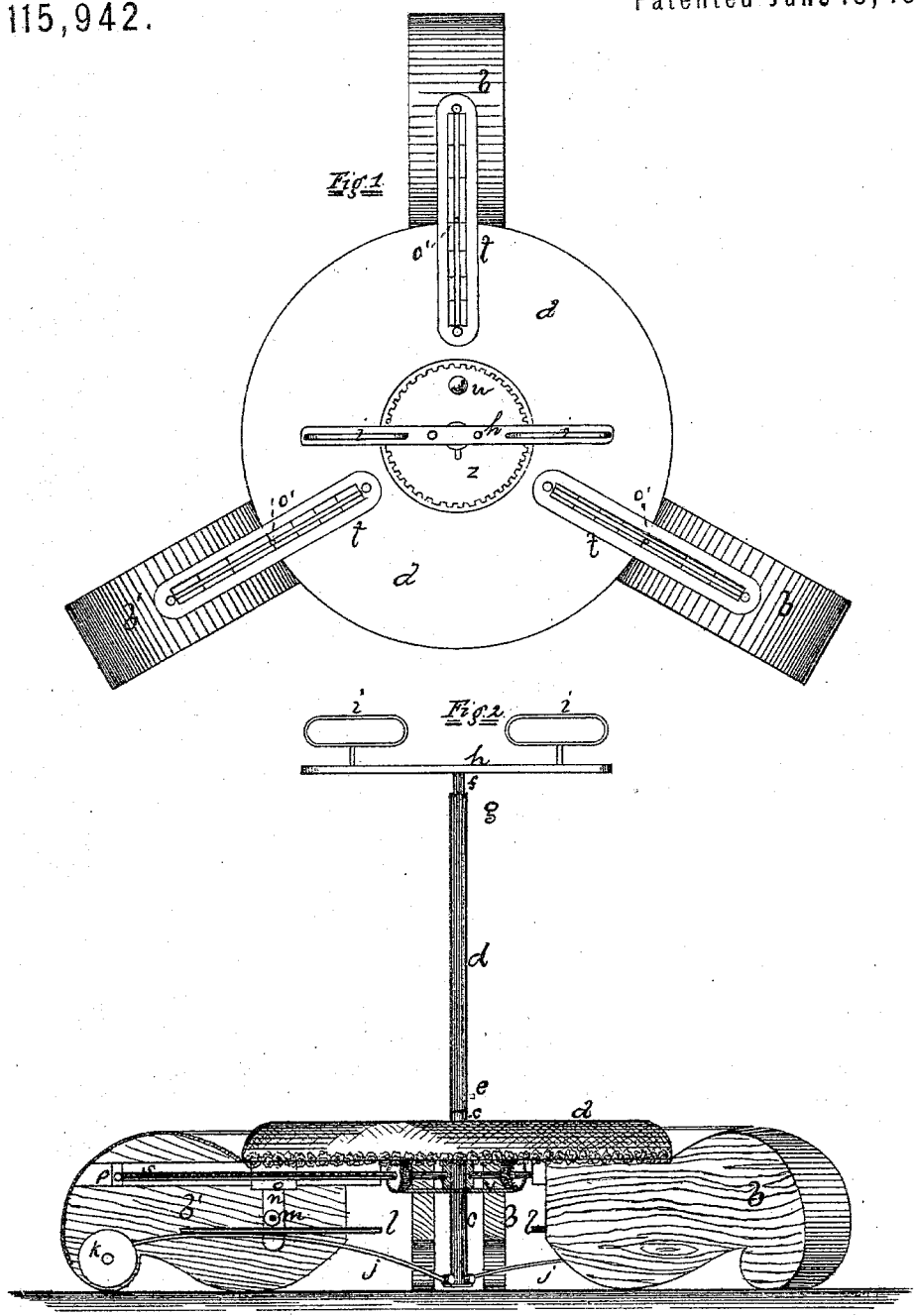

The heat of the bees, or other source, warming the air in the brood-chamber, causes it to pass out through the pipes K, fresh air being supplied through the aperture H at the extreme bottom of the hive. It will be seen that, by having the induction-opening at this point, and by means of the spaces between the frames $a$, the fresh air has access to every part of the brood-chamber, while the honey-chamber is not directly involved in the system of circulation, it not requiring ventilation to the same extent. This, it will be perceived, reduces the volume of air to be carried off by the amount which would be contained in the empty spaces of the honey-chamber were the vent-openings above. At the same time, while the volume of air to be moved and heated is less, the discharge opening or openings being near the place where the heat is generated, the air does not become cooled before being expelled, thus